US012795571B2

(12) United States Patent
Lee et al.

(10) Patent No.: US 12,795,571 B2
(45) Date of Patent: Nov. 10, 2026

(54) SYSTEM FOR CORRECTING CLOCK SKEW BETWEEN DEVICE FOR ACCURATE ESTIMATION OF ONE-WAY DELAYS

(71) Applicant: Google LLC, Mountain View, CA (US)

(72) Inventors: Tony Lee, San Diego, CA (US); Yong wei Chin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 289 days.

(21) Appl. No.: 18/440,604

(22) Filed: Feb. 13, 2024

(65) Prior Publication Data

US 2025/0261146 A1 Aug. 14, 2025

(51) Int. Cl.
*H04W 56/00* (2009.01)

(52) U.S. Cl.
CPC ..... *H04W 56/002* (2013.01); *H04W 56/0075* (2013.01)

(58) Field of Classification Search
CPC ........................ H04W 56/002; H04W 56/0075
See application file for complete search history.

(56) References Cited

U.S. PATENT DOCUMENTS

| | | | | |
|---|---|---|---|---|
| 10,621,049 | B1 * | 4/2020 | Certain | G06F 11/1466 |
| 2007/0162244 | A1 * | 7/2007 | Horikawa | H04L 41/06 702/89 |
| 2016/0330012 | A1 * | 11/2016 | Liu | H04L 43/087 |
| 2019/0253168 | A1 * | 8/2019 | Hansson | H04L 43/0864 |
| 2019/0306066 | A1 * | 10/2019 | Wigren | H04L 47/15 |
| 2019/0372747 | A1 * | 12/2019 | Choo | H04L 7/0008 |
| 2021/0058181 | A1 * | 2/2021 | Dwivedi | H04J 3/0667 |
| 2021/0119930 | A1 * | 4/2021 | Debbage | H04L 1/1621 |
| 2021/0288755 | A1 * | 9/2021 | Abedi | H04L 1/1678 |
| 2021/0345277 | A1 * | 11/2021 | Wigren | H04W 56/0045 |
| 2021/0385137 | A1 * | 12/2021 | Sridhar | H04L 47/2441 |
| 2022/0248357 | A1 * | 8/2022 | Regunathan | H04B 7/18528 |
| 2023/0055046 | A1 * | 2/2023 | Whited | H04J 3/0644 |
| 2024/0310510 | A1 * | 9/2024 | Dotlic | G01S 13/825 |
| 2024/0406892 | A1 * | 12/2024 | Aslam | H04W 56/0015 |
| 2025/0261146 | A1 * | 8/2025 | Lee | H04W 56/002 |

FOREIGN PATENT DOCUMENTS

| | | | | |
|---|---|---|---|---|
| EP | 4550762 | A1 * | 5/2025 | H04L 69/163 |

* cited by examiner

*Primary Examiner* — Parth Patel
(74) *Attorney, Agent, or Firm* — DORITY & MANNING P.A.

(57) ABSTRACT

The present disclosure provides methods, systems, and devices for correcting clock skew between devices for accurate estimation of one-way delays. A first computing device can transmit, to a second computing device, a plurality of time synchronization requests. The first computing device can receive, from the second computing device, a time synchronization response for each time synchronization request. The first computing device can calculate, for each time synchronization request, a round trip time for the time synchronization request. The first computing device can determine an estimated clock skew based, at least in part, on a minimum round-trip time from a plurality of calculated round trip times. The first computing device can estimate a one-way communication delay between the first computing device and the second computing device based, at least in part, on the time synchronization request, the time synchronization response, and the estimated clock skew.

19 Claims, 10 Drawing Sheets

SYSTEM FOR CORRECTING CLOCK SKEW BETWEEN DEVICE FOR ACCURATE ESTIMATION OF ONE-WAY DELAYS

FIELD

The present disclosure relates generally to accurate tracking of time in computing systems. More particularly, the present disclosure relates to using time-synchronization requests to estimate one-way delays based on corrections made using time skew estimations.

BACKGROUND

Improvements in technology have enabled a variety of different devices and services to be provided to users. Computing devices can provide these services by communicating with each other. However, communications between computing devices can be complicated due to clock drift. Clock drift occurs when the internal clock from a first device diverges from the internal clock of another device. Finding a way to identify the current clock drift and account for it can improve the communications between user computing devices.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include transmitting, from the first computing device to a second computing device, a plurality of time synchronization requests; wherein the first computing device has a first internal clock associated with a first time domain and the second computing device includes a second internal clock associated with a second time domain. The operations can include receiving, from the second computing device, a time synchronization response for each time synchronization request. The operations can include calculating, for each time synchronization request, a round trip time for the request. The operations can include determining an estimated clock skew between the first time domain and the second time domain based, at least in part, a minimum round-trip time from a plurality of calculated round trip times. The operations can include estimating a one-way communication delay between the first computing device and the second computing device based, at least in part, on the time synchronization request, the time synchronization response, and the estimated clock skew between the first time domain and the second time domain.

Another example aspect of the present disclosure is directed to a computer-implemented method. The method can include transmitting, from a first computing device to a second computing device, a plurality of time synchronization requests; wherein the first computing device has a first internal clock associated with a first time domain and the second computing device includes a second internal clock associated with a second time domain. The method can include receiving, from the second computing device, a time synchronization response for each time synchronization request. The method can include calculating, for each time synchronization request, a round trip time for the time synchronization request. The method can include determining an estimated clock skew between the first time domain and the second time domain based, at least in part, a minimum round-trip time from a plurality of calculated round trip times. The method can include estimating a one-way communication delay between the first computing device and the second computing device based, at least in part, on the time synchronization request, the time synchronization response, and the estimated clock skew between the first time domain and the second time domain.

Another example aspect of the present disclosure is directed to one or more non-transitory computer-readable media that collectively store instructions that, when executed by one or more computing devices, cause the one or more computing devices to perform operations. The operations can include transmitting, from the first computing device to a second computing device, a plurality of time synchronization requests; wherein the first computing device has a first internal clock associated with a first time domain and the second computing device includes a second internal clock associated with a second time domain. The operations can include receiving, from the second computing device, a time synchronization response for each time synchronization request. The operations can include calculating, for each time synchronization request, a round trip time for the time synchronization request. The operations can include determining an estimated clock skew between the first time domain and the second time domain based, at least in part, a minimum round-trip time from a plurality of calculated round trip times. The operations can include estimating a one-way communication delay between the first computing device and the second computing device based, at least in part, on the time synchronization request, the time synchronization response, and the estimated clock skew between the first time domain and the second time domain.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
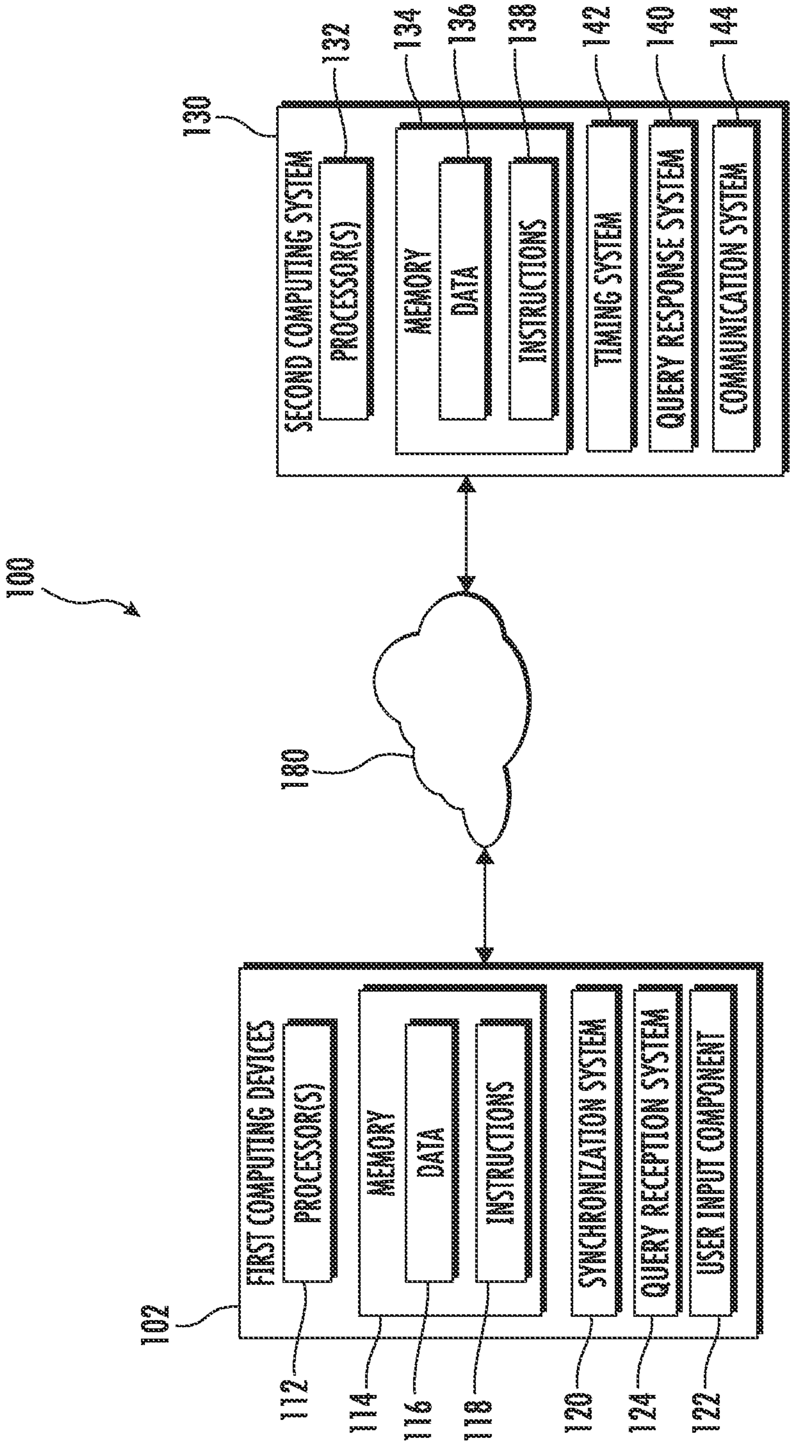
FIG. 1 depicts a block diagram of an example computing system 100 that determines one-way communication delays based on accurate estimation of time skews between computing systems according to example embodiments of the present disclosure.

Reference numerals that are repeated across plural figures are intended to identify the same features in various implementations.

DETAILED DESCRIPTION

Generally, the present disclosure is directed to systems and methods for estimating the one-way latency in communications between two computing devices and reducing or mitigating that latency. The two-way latency in communication between two computing devices can be estimated by measuring the round-trip time (RTT) in communications between the two computing devices. The total RTT can be divided in two and used to estimate latency for each direction of communication. However, such estimations are usually inaccurate because one or more factors can cause the latency in one direction to be longer than the latency in the other direction. In many applications, such an inaccurate estimation of the one-way latency is not satisfactory.

To determine a more accurate estimation of the delay in each direction of communication between two computing devices, the two computing devices need to be able to accurately measure the time at which information (e.g., data packets) is transmitted from a first computing device and received by a second computing device. Unfortunately, when two computing devices communicate wirelessly, they do not share a common clock. As such, over time, the clocks in each computing device can slowly diverge from each other. This can be referred to as clock drift. Clock drift can result in differences between the time domain of the first and second computing devices. As a result of these differences, it can be difficult to determine whether the differences between when a time synchronization request is sent by the first computing device and the time when the second computing device receives the time synchronization request is the result of latency during communication or time skew between the first computing device and the second computing device.

To solve this problem, the two computing systems can estimate the time skew between the two computing systems. Once the time skew is determined, the first computing device can accurately convert time data from the time domain of the second computing device into the time domain of the first computing device and vice versa. The first computing device can transmit a time synchronization request to the second computing device. The time synchronization request includes at least a request sending time, which indicates (in the time domain of the first computing device) the time at which the time synchronization request is sent.

The second computing device can receive the time synchronization request and, in response, transmit a time synchronization response to the first computing device. The time synchronization response can include a request reception time (which represents the time at which the second computing device receives the time synchronization request) and a response transmission time (which represents the time at which the second computing device transmits the time synchronization response). Both times included in the time synchronization response are in the time domain of the second computing device.

The first computing device can receive the time synchronization response and, based on the time it was received and the time the corresponding time synchronization request was transmitted, determine the total round-trip time RTT of that request. A plurality of time synchronization requests can be sent during a particular interaction. The first computing device can determine the smallest round trip time value from the priority of determined round trip time values.

The first computing device can determine the skew between the two clock domains by comparing the time at which the time synchronization request was sent to the time at which the time synchronization request was received and the difference between the time at which the time synchronization response was sent and the time at which the time synchronization response was received. The estimated time skew value can have an error associated with it. The error can be bounded based on the smallest round-trip time. The communication protocol the computing devices use can be one with a very low latency, such as Bluetooth. This communication protocol can result in a very small round-trip time for at least some transmissions. For example, the round-trip time can be as low as ten milliseconds. As a result, the final estimated time skew can be very accurate.

Once the time skew has been determined, the first computing device can convert any times received from the second computer device into the time domain of the first computing device. For example, suppose the time skew between the first computing device and the second computing device is determined to be 5 seconds (e.g., the second computing device reads 5 minutes and 35 seconds after midnight when the first computing device reads 5 minutes and 30 second after midnight). In that case, the first computing device can convert times from the second computing device into the time domain of the first computing device by subtracting 5 seconds from all times received from the second computing device. Continuing the above example, the second computing device time of 5 minutes and 35 seconds after midnight would have 5 seconds subtracted to be equal to the first computing device time of 5 minutes and 30 second after midnight. Once the first computing device has converted the times from the second computing device into the first time domain, the first computing device can determine an accurate estimation of when the time synchronization request was sent and when the second computing device received it. This difference can be the one-way latency in the communication between the first computing device and the second computing device. A similar process is used to find the one-way latency from the second computing device and the first computing device.

In some examples, the first computing device can be a smartwatch and the second computing device can be a smartphone with which it is paired. Communication between the two occurs when a user makes a request using the smartwatch as the input device, and that request is transmitted to the smartphone. In some examples, the request is an audio query from the user. The request can be broken down into a plurality of small data packets. These data packets (e.g., query packets) can be transmitted from the smartwatch to the smartphone.

In some examples, the communication capabilities of the smartphone (e.g., the second computing device) may be in a lower power listening state (or sleep state). As a result, the initial packets may have higher than expected latency while the communication capabilities of the second computing device or the connection link between the two devices is switched into an active mode. To reduce this activation latency, the smartwatch can transmit a time synchronization request to the smartphone before any query data is transmitted to the smartphone (e.g., as soon as the user begins the query). In some examples, rather than the communication capabilities of the second computing device entering a sleep or low power mode, the connection between the first and second computing devices can enter a sleep or low power mode. Thus, the communication systems of each computing device may not change state but the connection link between the two devices may change state (wherein the state is based on information maintained by one or more of the two computing devices.

The smartphone can transmit the query to a remote server computing system to receive a response to the query. While the remote server computing system is generating a response to the query, the smartwatch may not transmit data to the smartphone. As a result, the smartphone's communication system may go back into sleep or passive mode to save energy. If the smartwatch is in a sleep or passive mode, there will be additional latency in responding to the smartwatch with the response from the server while the communication system (or link between the two devices) is transitioned into active mode. To prevent this additional latency, the smartwatch can periodically transmit time synchronization requests to the smartphone such that the communication link between the two remains in active mode. The time until the response is received is usually relatively short, so very little excess power is consumed, but the reduction in latency can result in an improved user experience. The time synchronization requests can be transmitted frequently enough that the duration between the time synchronization requests is less than the time period that enables the communication system of the second computing device to transition into a sleep mode.

As soon as the user intent of issuing the query was detected and before the very first query audio packet is generated for delivering, the first computing device can transmit a time synchronization request to the second computing device. Thus, the time synchronization requests can cause the communication capabilities of the smartphone (or the communication link between the two devices) to become active. Activating the communication capabilities of the smartphone before the query data packets are transmitted will result in much less latency when the query data packets begin to be transmitted.

Similarly, the smartphone can transmit the query to a remote server computing system to receive a response to the query. While the remote server computing system is generating a response to the query, the smartwatch may not transmit data to the smartphone. As a result, the smartphone's communication system may go back into sleep or passive mode to save energy. If the smartwatch is in asleep or passive mode, there will be additional latency in responding to the smartwatch with the response from the server while the communication system of the second computing device (or the link between the two devices) is transitioned into active mode. To prevent this additional latency, the smartwatch can periodically transmit time synchronization requests to the smartphone such that the communication between the two remains in active mode. The time until the response is received is usually relatively short, so very little excess power is consumed, but the reduction in latency can result in an improved user experience.

Thus, aspects of the proposed systems and methods represent a technical solution to the technical problem of estimating time skew between two different computing systems. In particular, divergent time domains can make communication more difficult between the two systems (especially in situations in which accurate timing of communications is important). For example, if the receiving system is expecting a communication at a particular time, the transmitting system can more accurately provide the expected communication if the time skew between the two systems is estimated accurately. Similarly, it is more difficult to identify and resolve sources of communication delay if the two systems are unable to estimate time skew between their two systems. Accurate estimation of time skew can therefore reduce the amount of communication needed between two systems to resolve problems (e.g., latency, inaccurate and mistimed communications, and so on). This reduces bandwidth usage and unnecessary computational load.

With reference now to the Figures, example embodiments of the present disclosure will be discussed in further detail.

FIG. 1 depicts a block diagram of an example computing system 100 that determines one-way communication delays based on accurate estimation of time skews between computing systems according to example embodiments of the present disclosure. The computing system 100 includes a first computing device 102 and a second computing device 130.

The first computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The first computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the first computing device 102 to perform operations.

In some implementations, the first computing device 102 can include a synchronization system 120, a query reception system 124, and a user input component 122. In some examples, the synchronization system 120 can use one or more time synchronization requests to determine the time skew between the first computing device 102 and the second computing device 130. To do so, the synchronization system 120 can periodically generate a time synchronization request and transmit it to the second computing device 130. The time synchronization request can include time data representing the time the time synchronization request was transmitted from the first computing device 102 to the second computing device.

The second computer device 130 can receive the time synchronization requests through the computing network 180. The second computing device 130 can respond to the time synchronization request with a time synchronization response. The time synchronization response can include time data indicating the time at which the time synchronization request was received by the second computing device 130. The time synchronization response can also include time data (e.g., a time stamp) indicating a time at which the time synchronization response was transmitted back to the first computing device 102.

The first computing device 102 can receive the time synchronization response and, based on the time the time synchronization request was received and the time the corresponding time synchronization request was transmitted, determine the total round-trip time of that request. A plurality of time synchronization requests can be sent during the time of a particular interaction. The first computing device 102 can determine the smallest round trip time value from the plurality of determined round trip time values.

The first computing device 102 can determine the skew between the two clock domains by comparing the time at which the time synchronization request was sent, the time at which the time synchronization request was received, and the difference between the time at which the time synchronization response was sent and the time at which the time synchronization response was received. The estimated time skew value can have an error associated with it. The error can be bounded based on the smallest round-trip time. The communication protocol the computing devices use can be one with a very low latency, such as Bluetooth. Using this communication protocol can result in a very small round-trip time for at least some of the transmissions. For example, the minimum round-trip time can be around ten milliseconds. As a result, the final estimated time skew can be very accurate.

For example, to determine the skew (K) between the first computing device 102 and the second computing device 130, the first computer device 102 can determine the time at which the first time synchronization request (T1) was sent from the first computing device 102, the time that the time synchronization request was received by the second computing device 130 (T2), the time that the time synchronization response was sent from the second computing device 130 (T3), and the time that the time synchronization response was received at the first computing device 102 (T4). As noted, T1 and T4 are in the clock domain of the first computing device 102, and T2 and T3 are in the clock domain at the second computing device 130.

The round-trip time (RTT) can be the time between T1 and T4. RTT can be the difference between the time at which the time synchronization request was sent and the time at which the time seeking position response was received. The round-trip time can include two delays, the first delay (D1) being the time of communication from the first computer device 102 to the second computing device 130. The second delay (D2) is the time four communication between the second computing device 130 and the first computing device 102. In some examples, the system can estimate that D1 and D2 are the same. However, given the plurality of factors involved such an estimation is likely untrue and will not give an accurate idea of the time skew between the first-time domain associated with the first computing device 102 and the second time domain associated with the second computing device 130.

T2 (the time at which the time synchronization request is received by the second computing device 130) can be the time at which the time synchronization request was sent (T1) plus the delay in transmitting from the first computing device 102 to the second computing device 130 (D1) plus the skew between the first time domain and the second time domain. The following formula can represent T2.

$$T2 = T1 + D1 + K$$

Similarly, the time at which the first computing device receives the time synchronization response can be determined based on the time at which the time synchronization response is transmitted from the second computing device 130 (T3), plus the delay in transmitting from the second computing device on three zero to the first computing device 102 (D2), plus the time scale between the first time domain on the second time domain. The following formula can then represent T4:

$$T4 = T3 + D2 + K$$

Time skew (K) between the first time domain and the second time domain can be determined by the following set of formulas:

$$K = T2 - T1 - D1 = T3 - T4 + D2$$

$$2 * K = T2 - T1 - D1 + T3 - T4 + D2$$

$$2 * K = (T2 - T1) + (T3 - T4) + (D2 - D1)$$

$$K = \frac{((T2 - T1) + (T3 - T4)) + (D2 - D1)}{2}$$

$$K = \frac{((T2 - T1) + (T3 - T4))}{2} + \frac{(D2 - D1)}{2}$$

$$K = \frac{((T2 - T1) + (T3 - T4))}{2} + \text{error}$$

Note that given that D1 and D2 are unknown and not guaranteed to be equal, (D2–D1)/2 can be treated as the margin of error for K. Considering that D1 and D2 must both be a positive value (i.e., it's impossible for latency to be zero or negative), RTT must bound the margin of error in the following way:

$$-RTT < (D2 - D1) < RTT$$

$$\frac{-RTT}{2} < \frac{(D2 - D1)}{2} < \frac{RTT}{2}$$

$$\frac{-RTT}{2} < \text{error} < \frac{RTT}{2}$$

The error in the measurement of the skew is bounded by the round-trip time. As such, the lower the latency for a particular communication protocol, the lower the error in the estimated skew. In some examples, the Bluetooth communication protocol can have a minimum latency of about ten milliseconds for a round trip. Thus, the Bluetooth communication protocol can be used to estimate the skew between two time domains with reasonably high precision. In some examples, a particular upper bound (such as 20 milliseconds) can be used to determine whether a specific communication protocol has low enough latency to accurately estimate the skew (K) between two time domains.

The latency required for good estimation can depend at least partially on the level of tolerance for error for a particular application. For certain applications, if their level of tolerance is high (i.e., tolerance for lower latency accuracy), their minimal thresholds can be adjusted higher and accordingly.

Once the synchronization system 120 has estimated the skew between the first time domain associated with the first computing device 102 and the second time domain associated with the second computing device 130. The synchronization system 120 can correct the times received from the second computing device 130 to determine the one way delay between the first computing device 102 and the second computing device 130. Similarly, the synchronization system 120 can estimate the one-way delay between the second computing device 130 and the first computing device 102.

Once the synchronization system 120 has determined the one-way delay between the first computing device 102 and the second computing device 130, the synchronization system 1220 can use that information when transmitting data between the two devices to more accurately determine when and at what stage of the communication the delays are occurring and when communications should be sent so they arrive at a particular time.

The query reception system 124 can receive a query from a user via the user input component 122. For example, if the first computing device 102 is a smartwatch, and the user wishes to enter a query, the user can enter the query either by voice communication with the first computing device 102 or by manual input (e.g., selecting elements on the screen of the first computing device 102). The query reception system 124 can receive the query, generate a series of query packets that collectively include all necessary query data, and transmit the series of query packets to the second computing device 130. In some examples, the communication protocol between the first computing device 102 and the second computing device 130 has a sleep state and an active state. In the sleep state, less power is consumed. The first computing device 102 can initiate a wake-up procedure that will switch the second computing device 130 into active mode.

In some examples, once the query reception system 124 has transmitted the query packets to the second computing device 130, there is a wait time while the second computing device 130 processes the query and/or communicates with a server system to receive a response to the query. In some examples, if the period between receiving the query packets and transmitting a response back to the first computing device 102 is greater than the period during which the communication protocol will switch back to the passive state, the resulting latency can be significant. For example, if the transmittal time is around ten milliseconds while in the active mode and waking the communication protocol from the passive mode to the active mode takes 500 milliseconds, the delay is 50 times greater than the minimum communication time.

To reduce this potential latency, the query reception system 124 can use the synchronization system 120 to continue to transmit time synchronization requests periodically through the waiting period (e.g. while the query is being processed). Doing so will ensure that the second computing device 130 will not switch back to passive mode from active mode. As a result, as soon as the query response is ready to be sent to the second computing device 130, it can be sent without needing any additional time to wake the communication protocol system up.

Similarly, when a query is being received, a relatively large amount of time can pass before the first query packet is ready to be sent. The query reception system 124 can, once it determines a query is being input, begin transmission of time synchronization requests via the synchronization system 120. The time synchronization requests can cause the second computing device 130 to switch its communication system from a passive listening mode into an active mode. Thus, by the time the query packets are ready to be transmitted, the second computing device 130 can already be in active mode. Therefore, the additional latency caused by switching into the active mode will not delay the query itself. In this way, by initiating the time synchronization requests immediately upon determining that a query is being input and continuing to send those time synchronization requests during the time in which a query response is being prepared by the second computing device 130, the first computer device 102 can significantly reduce the latency in communication between the first computing device 102 and the second computing device 130.

Once the second computing device 130 has prepared the response, the query response system 140 can transmit a series of query packets from the second computing device 130 to the first computing device 102. The query reception system 124 can receive the query response packets and can cause the first computing device 102 to present the response to the user. The response can be presented as audio content, visual content, or textual content.

The user computing device 102 can also include one or more user input components 122 that receive user input. For example, the user input component 122 can be a touch-sensitive component (e.g., a touch-sensitive display screen or a touchpad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The second computing device 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

As described above, the second computing device 130 can include a timing system 142 and a query response system 140. In some examples, the timing system 142 can be used to determine the time, in the second time domain associated with the second computing device 130, at which requests are received and responses are sent. Thus, if the timing system 142 receives a time synchronization request from the first computing device 102, the timing system 142 can determine the time the request was received within the second time domain associated with the second computing device 130.

Similarly, when time synchronization responses are generated, the timing system 142 can determine the time at which the response is sent and can include the time data representing that time in the time synchronization response itself. Thus, the timestamps generated by the timing system 142 can be used by the 1st computing device not to determine a time skew between the first time domain associated with the first computing device 102 and the second time domain associated with this second computer device 130.

In some examples, the query response system 140 can receive queries from the first computing device 102. In some examples, the query request can be transmitted as a series of query packets associated with the query itself. The query response system 140 can analyze the query packets to extract the query data from the query packets. The query response system 140 can then generate a response to the query. In some examples, the query response system 140 can transmit the query to a server system associated with generating query responses. The query response system 140 can receive the query response from the server system.

In some examples, the communication system 144 can manage communications between the second computing device 130 and the first computing device 102. In some examples, the communication system can use the Bluetooth protocol to communicate with computing devices near the second computing device 130. In some examples, the communication system 144 can have active and passive modes. While in the passive mode, the communication system 144 consumes less power. In the active mode, the second computing device 130 can communicate with other computing devices in the area with relatively low latency (e.g., around ten milliseconds).

In some examples, the communication system 144 can transition from the passive listening mode to an active mode in response to communications from another computing device. For example, the first computing device 102 can transmit requests to the second computing device 130, and in response, the communication system 144 can transition from the passive mode to the active mode. In some examples, the transition from the passive mode to the active mode can be relatively time-consuming (e.g., 500 milliseconds).

In some examples, the communication system 144 can transition from active mode to passive mode in response to one or more different situations. For example, if a period of time passes without any new communications, the communication system 144 can automatically transition from the active mode to the passive mode to preserve power. Thus, if there is a temporary communication break, communication system 144 may transition to passive mode. In order to prevent this from happening, the first computing device 102 can transmit periodic synchronization requests to ensure that the second computing device 130 remains in active communication mode while an active query is still going on (e.g., the second computing device 130 is generating a response to a query). For example, after the first computing device 102 transmits query data to the second computing device, the first computing device can continue to transmit time synchronization requests to the second computing device such that the communication system 144 does not transition to the passive mode. In this way, when the query response has been generated by the query response system 140 or by a third-party server in the system, the second computing device 130 can transmit the query response quickly back to the first computing device 102 without the additional latency of switching the communication system 144 from the passive mode to the active mode.

The network 180 can be any type of communications network, such as a local area network (e.g., intranet), wide area network (e.g., Internet), or some combination thereof, and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 2:
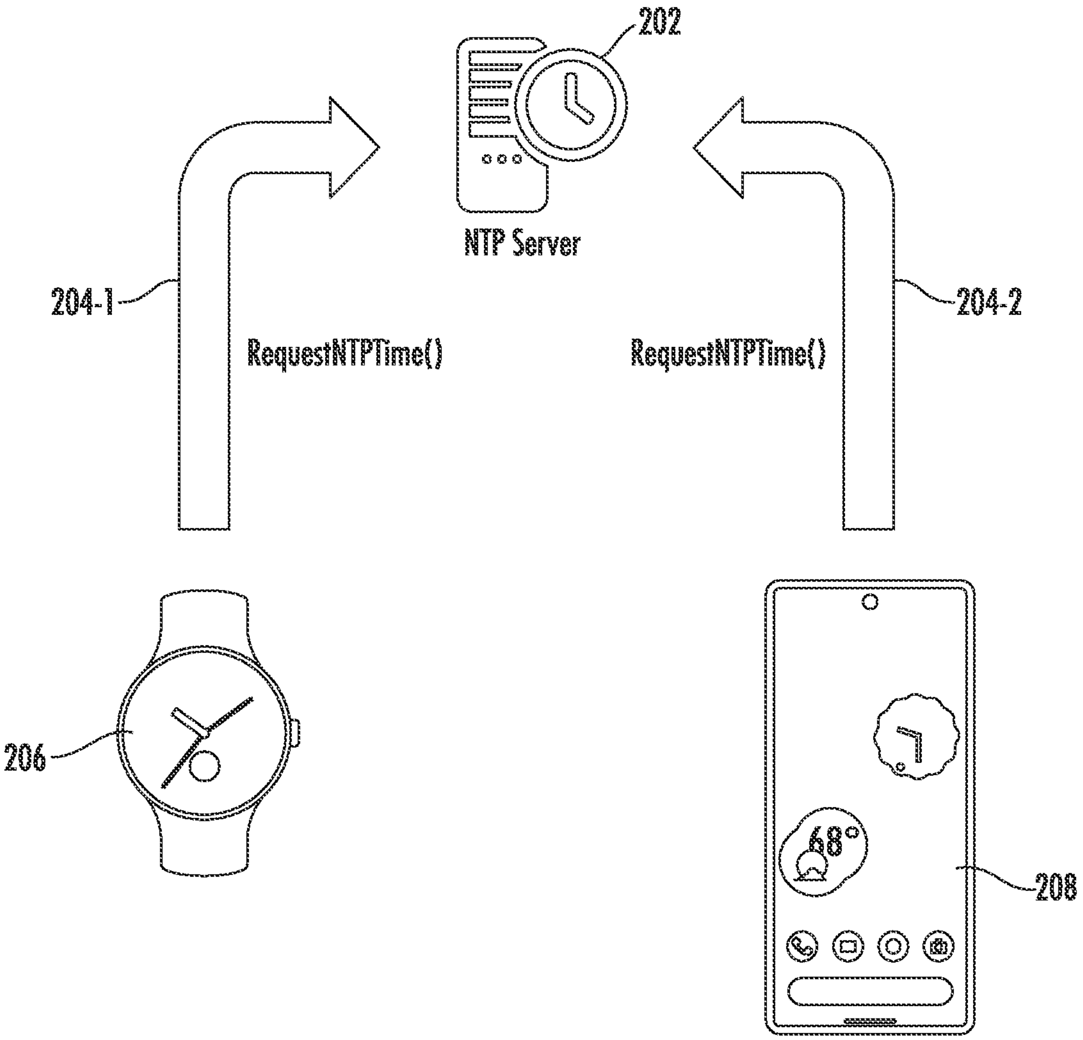
FIG. 2 depicts an example of a system for synchronizing a plurality of devices with an external universal clock according to example embodiments of the present disclosure.

FIG. 2 depicts an example of a system for synchronizing a plurality of devices with an external universal clock according to example embodiments of the present disclosure. In this example, every computing device has an internal time domain that tracks time. However, due to clock drift, over time, the internal time domain of a particular computing device can diverge from the actual time associated with the real world. To prevent this from happening on too large a scale, remote server 202 can provide accurate time data to devices. A plurality of devices can transmit time requests (204-1 and 204-2) to the remote server 202. The remote system 202 can respond to these requests by transmitting A timestamp or other time data to each requesting device. In this way, each computing device can update its internal time domain without relying on other computing devices other than the remote system 202.

In some examples, computing devices that communicate frequently, such as the smartwatch 206 and the smartphone 208 in this figure, can independently retrieve time data from the remote system 202. Thus, when they update their time, there can be a relatively small difference between the time domain of the smartwatch 206 and the smartphone 208. However, over time, minute differences between the devices can cause the internal time for each clock to diverge. This divergence can be referred to as clock drift and the difference between the time at a first computing device (e.g., a first time domain) and the time at a second computing device (e.g., a second time domain) can be referred to as clock skew. The smartwatch 206 can communicate frequently by transmitting data to and receiving data from the smartphone 208. The presence of clock skew can make it difficult for the devices to anticipate when the other device will receive communications from them and when they should expect communications from the other device. In addition, if there is unexpected latency, the difference in the clock domains can make it difficult to accurately determine what part of the communication system is responsible for the latency. It would be useful to measure the clock skew between the two devices.

Figure 3:
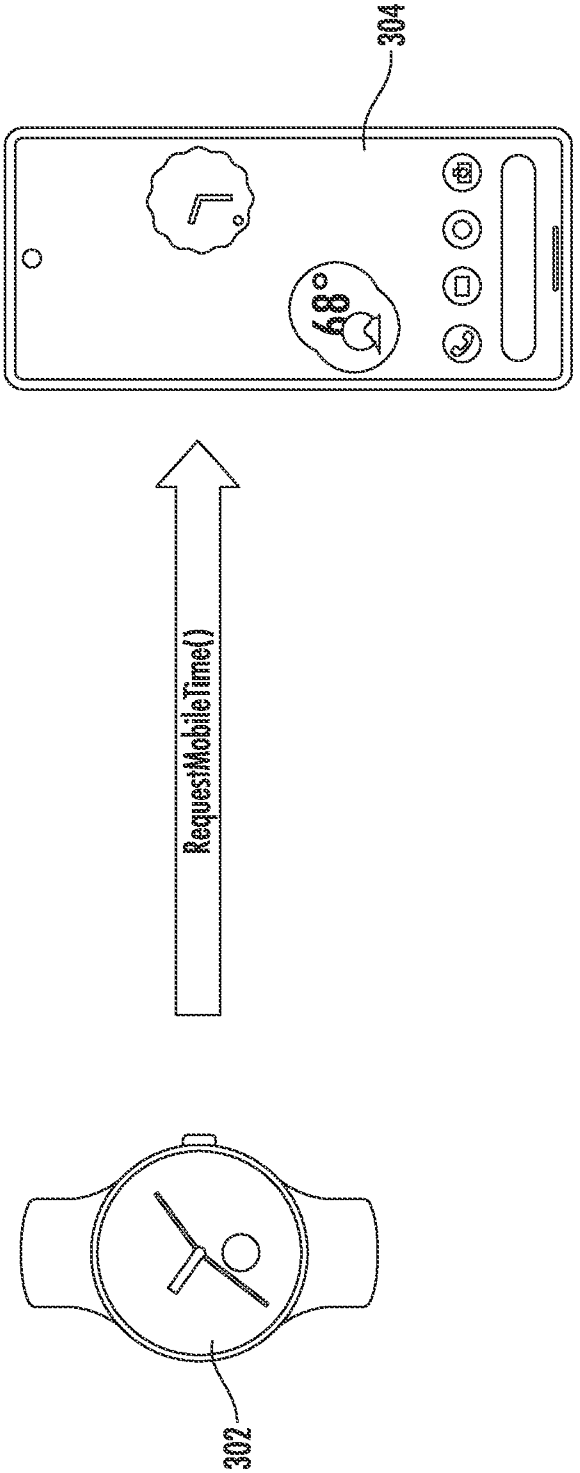
FIG. 3 illustrates an example system for a wearable computing device using a smartphone to update its internal time domain in accordance with example embodiments of the present disclosure.

FIG. 3 illustrates an example system for a wearable computing device using a smartphone to update its internal time domain in accordance with example embodiments of the present disclosure. In this example, rather than having all devices manually reach out to the remote server 202, devices that primarily communicate with another computing device, such as the wearable computing device 302 (e.g., a smartwatch), can request the time from the user computing device 304 (e.g., smartphone). The wearable computing device 302 can determine the time skew (i.e., offset) with the mobile device. The wearable computing device 302 can use the timestamps received from the mobile side and adjust them with the skew to determine the correct time from the perspective of the wearable computing device 302. In other words, as long as there is a way for the wearable computing device 302 to derive an accurate time from the time data provided by the user computing device as needed, there is no need for both wearable computing device 302 and user computing device 304 to be tightly synchronized with an external universal clock from a remote server.

Figure 4:
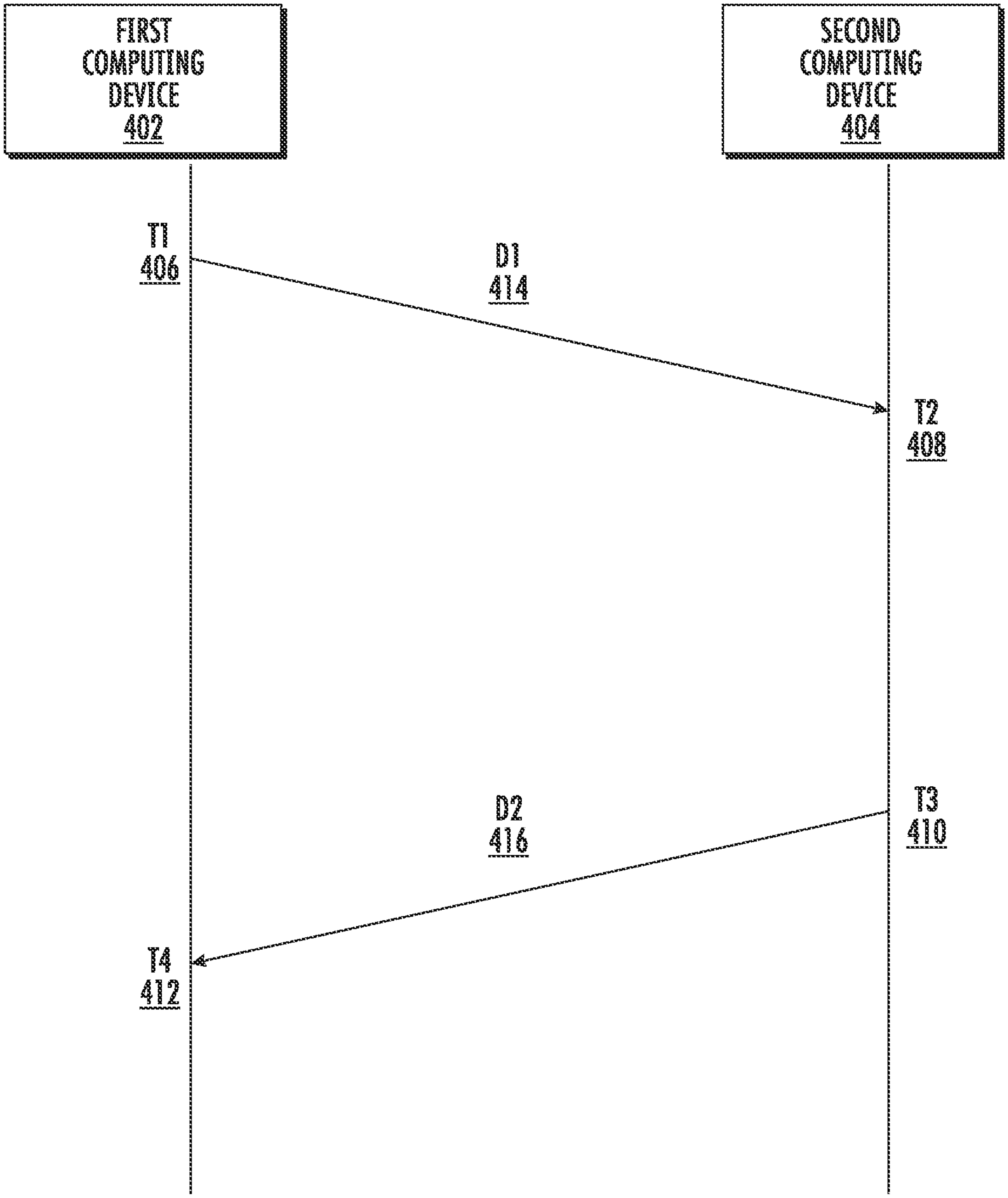
FIG. 4 illustrates an example process for communicating between two computing systems in accordance with example embodiments of the present disclosure.

FIG. 4 illustrates an example process for communicating between two computing systems in accordance with example embodiments of the present disclosure. In this example, the first computing device 402 (e.g., a wearable computing device such as a smartwatch) communicates with a second computing device 404 (e.g., a smartphone). The communication process includes a communication sent from the first computing device 402 (e.g., a time synchronization request) and the response to it by the second computing device 404, which is returned to the first computer device 402.

In this example, the time the first request is transmitted is denoted as T1 406. The time the request arrives at the second computing device is called T2 408. The difference between T1 406 and T2 408 can be the delay in transmitting the request from the first computing device 402 to the second computing device 404. This delay can be referred to as D1 414. Similarly, the time at which the second computing device 404 transmits the time synchronization response can be referred to as T3 410. The time at which the first computing device 402 receives the response can be referred to as T4 412. The difference between these two times can be referred to as the second delay or D2 416. In some examples, the time between T2 408, when the mobile device receives the request, and T3, when the response is transmitted, can be processed in time P.

Using these measurements (T1, T2, T3, T4, D1, and D2), the first computing device 402 can estimate this time skew between the first computing device 402 and the second computing device 404. Using the time skew, the first computing device 402 can convert time stamps (and other time data) into the first time domain associated with the first computing device 402.

Figure 5:
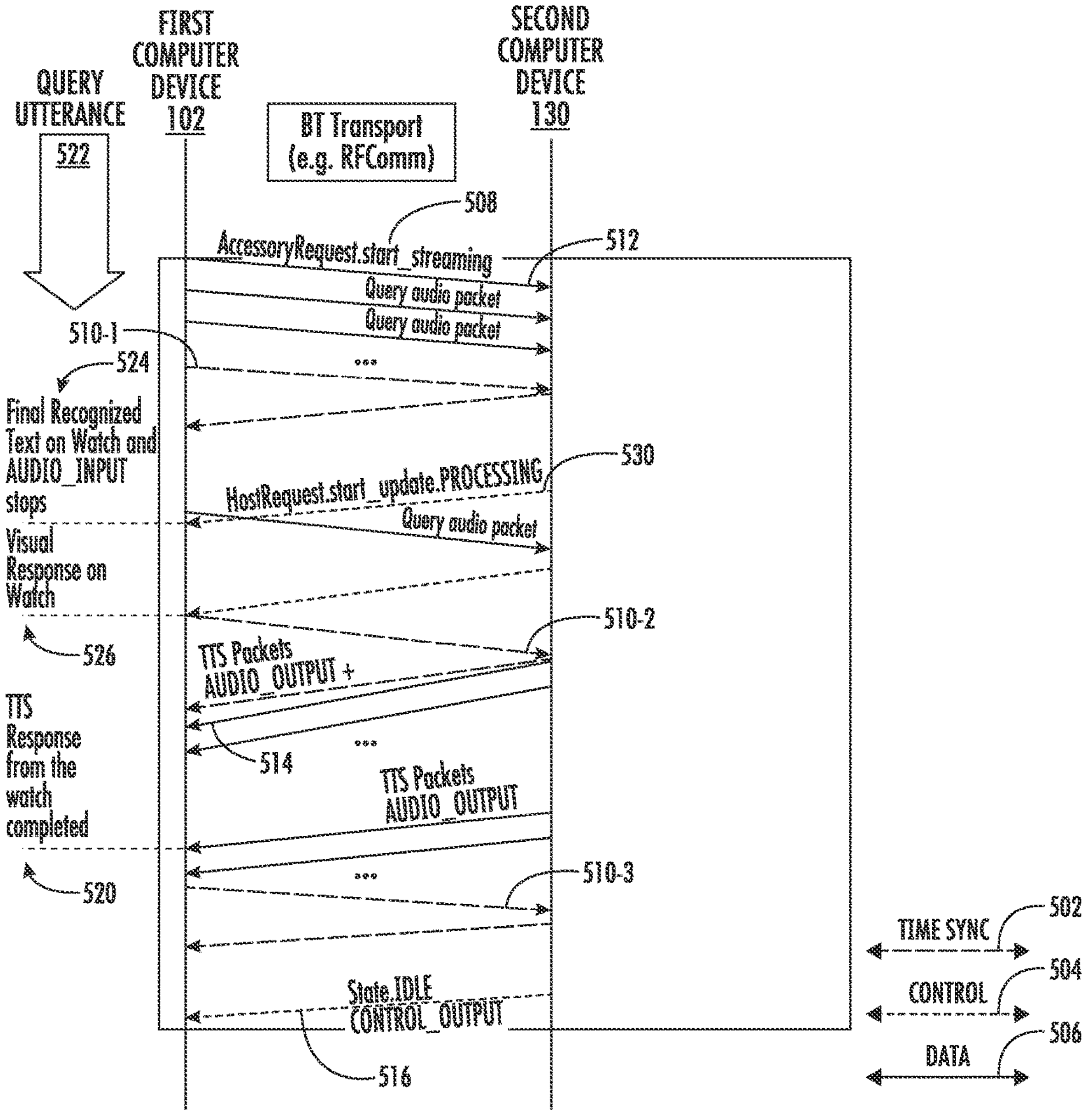
FIG. 5 illustrates an example process for estimating a one-way delay time for communications between a first computer device and the second computing device in accordance with the example embodiments of the present disclosure.

FIG. 5 illustrates an example process for estimating a one-way delay time for communications between a first computer device and the second computing device in accordance with the example embodiments of the present disclosure. In this example, there are three types of communication. The first type 502 is communications associated with a time synchronization request (also referred to as a ping pong communication). The second type of communications are control requests 504. The third type of communications are data communications 506.

In this example, the first computing device 102 receives a query utterance 522. The query utterance 522 can be an audio query received from a user (e.g., after the user uses a key phrase or input to initiate the audio query. In response to receiving the query utterance 522, the first computing device 102 can send a control request 508 indicating that an audio query is about to be streamed (e.g., AccessoryRequest.start_streaming).

Once the control request 508 has been transmitted, the first computing device 102 can begin streaming query audio packets 512, the query audio packets 508 can include query data. These query audio packets 512 can be transmitted from the first computing device 102 to the second computing device 130. Once the query utterance 522 has finished, the user can confirm the final recognized text on the first computing device 102 (e.g., the screen on the smartwatch) and the query utterance stops at 524.

While the control requests and data requests are ongoing, the first computer device 102 can periodically transmit time synchronization requests (see 510-1, 510-2, and 510-3). These requests can be transmitted periodically in the transport layer to collect T1, T2, T3, and T4 values. Furthermore, each time the time synchronization request is transmitted, the first computing device 102 can determine the round-trip time for the request. The first computing device 102 can determine the lowest round-trip time measured in the plurality of requests. This lowest round-trip time can be used as the bound for error measuring when determining clock skew.

The second computing device 130 can transmit a control message 530 indicating that the query is being processed (e.g., a Hostrequest.start_update.PROCESSING communication). In response to receiving the control message from the second computing device 130 indicating that the query is being processed 530, the first computing device 102 can generate a visual response 526 on the display of the first computing device 102 (e.g., the screen of a smartwatch).

Once the second computing device 130 has finished processing the query, it can transmit the query response to the first computing device 102. The query response can be transmitted as a plurality of audio output packets 514. Once the plurality of audio output packets 514 have been transmitted, the second computing device 130 can display an indication 520 that the response from the second computing device 130 is completed. The second computing device 130 can transmit a control message 516 indicating that the state of the communication system has entered the "IDLE" state (e.g., a passive state).

Figure 6:
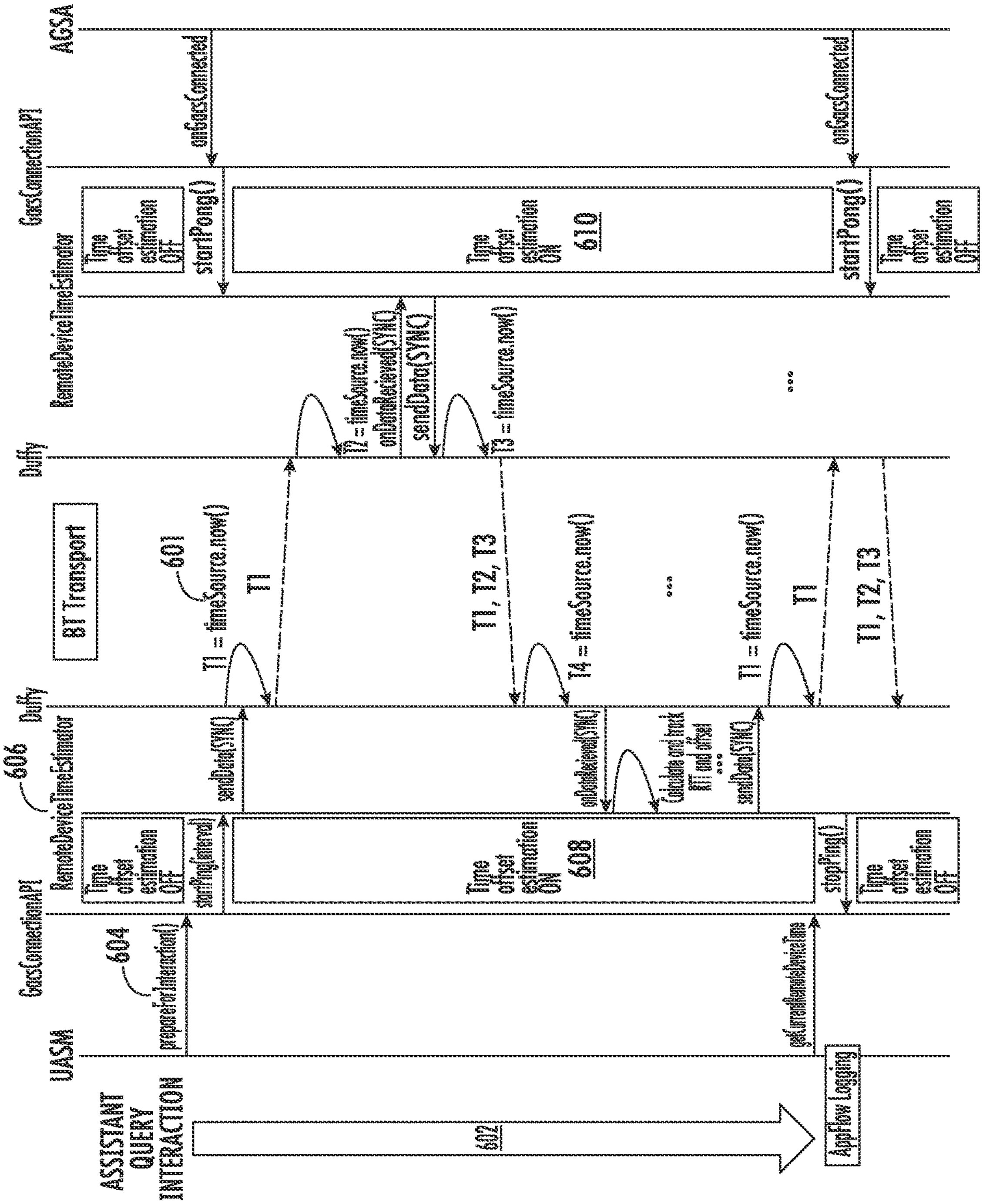
FIG. 6 illustrates an example process for synchronizing the time domains between two devices using time synchronization requests in accordance with the example embodiments of the present disclosure.

FIG. 6 illustrates an example process for synchronizing the time domains between two devices using time synchronization requests in accordance with the example embodiments of the present disclosure. In this example, a first computing device (e.g., first computing device 102 in FIG. 1) can be in a first mode. In the first mode, the time offset estimation (e.g., time skew estimation) is off. Similarly, the second computing device (e.g., second computing device 130 in FIG. 1) is a first mode in which the time offset estimation (e.g., time skew estimation) is off.

The first computing device (e.g., first computing device 102 in FIG. 1) can receive user input indicating an assistance query interaction 602. In response, the first computing device (e.g., first computing device 102 in FIG. 1) can call the prepare for interaction method 604. In response, the remoteDeviceTimeEstimator 606 can switch the first computing device 102 into a second mode with the time offset estimation ON 608. The second computing device (e.g., second computing device 130 in FIG. 1) can also enter the second mode and set the time offset estimation to ON 610.

The first computing device (e.g., first computing device 102 in FIG. 1) can generate a time synchronization request. The first computing device (e.g., first computing device 102 in FIG. 1) can call the timeSource.(now) method 610 to determine the time T1. T1 can be in the first time domain associated with the first computing device. The time (e.g., a timestamp) can be included in the time synchronization request. The time synchronization request can be transmitted to the second computing device (e.g., second computing device 130 in FIG. 1).

The second computing device 130 can receive the time synchronization request and call the timeSource.now( ) method to determine the time (T2) at which the time synchronization request is received in the second time domain (e.g., the time domain associated with the second computing device 130). The second computing device 130 can notify the Remote Device Time Estimator that a time synchronization request has been received and receive instructions to send a time synchronization response in return. The second computing device (e.g., second computing device 130 in FIG. 1) can call timeSource.now( ) to determine the time (T3) of sending the time synchronization response (T3) in the second time domain and transmit the time synchronization response to the first computing device 102 with T1, T2, and T3 included.

The first computing device (e.g., first computing device 102 in FIG. 1) can call the timeSource.now( ) method to determine the time (T4) at which the time synchronization response is received in the first time domain. Using the time data (T1, T2, T3, and T4), the first computing device (e.g., first computing device 102 in FIG. 1) can determine a total round-trip time and estimate the skew between the first and second time domains. The first computing device (e.g., first computing device 102 in FIG. 1) can continue to send time synchronization requests until it determines (e.g., via a getCurrentRemoteDeviceTimeOf ( ) method call) that the time synchronization requests are no longer needed. At this time, the RemoteDeviceTimeEstimator can switch into the first mode and set the time offset estimation to OFF. Similarly, the second computing device (e.g., second computing device 130 in FIG. 1) can change into the first mode and the set time offset estimation to OFF.

Figure 7:
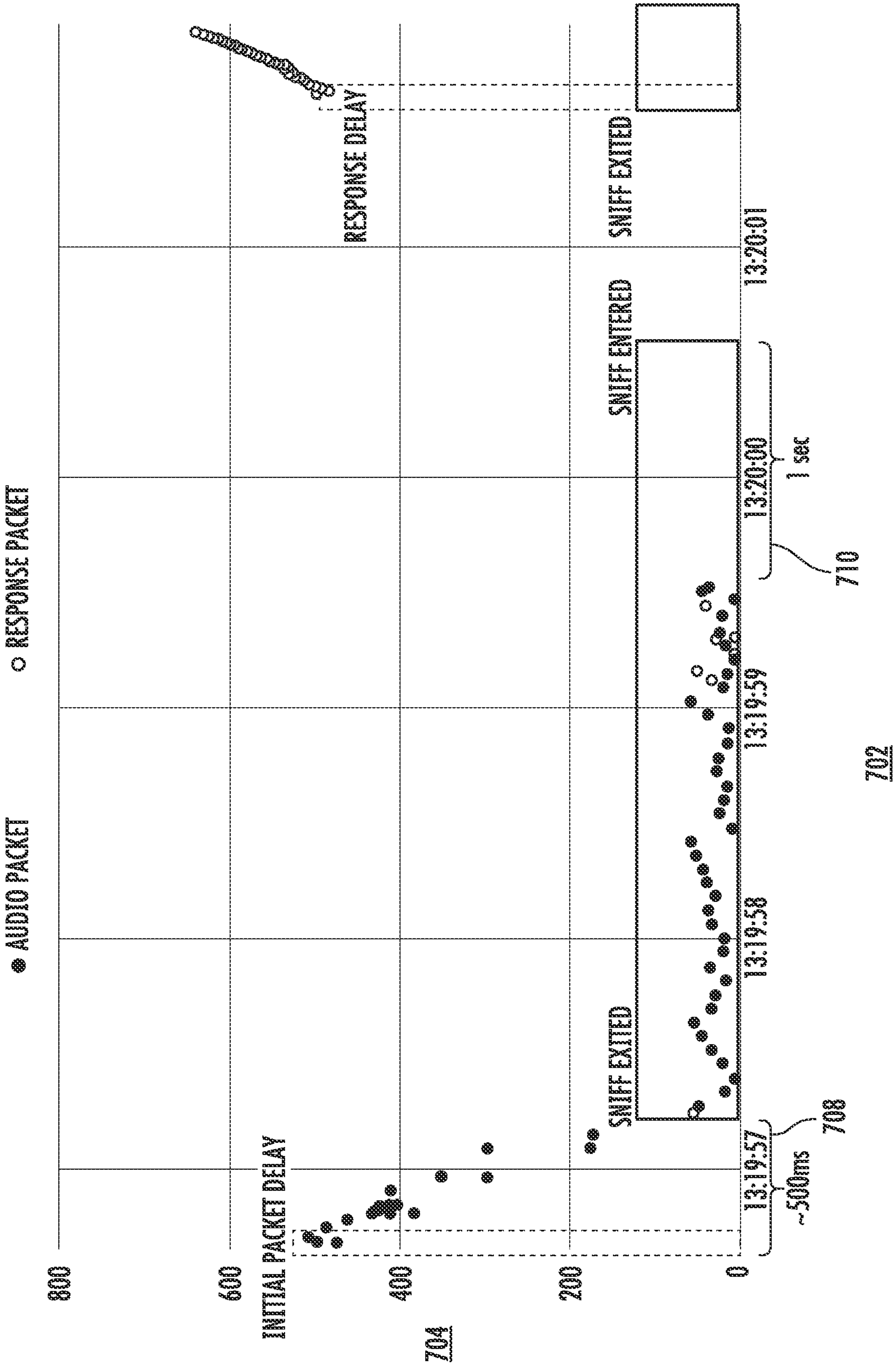
FIG. 7 is an example of a graph displaying the amount of packet delay for transmissions between a first computing device and a second computing device in accordance with the example embodiments of the present disclosure.

FIG. 7 is an example of a graph displaying the amount of packet delay for transmissions between a first computing device and a second computing device in accordance with the example embodiments of the present disclosure. In this example, the x-axis 702 of the graph represents time. The y-axis 704 represents the amount of delay in milliseconds for each packet.

As can be seen, the initial packets in the first portion of graph 708 have a relatively high packet delay. For example, the initial packet starts at a delay of around 500 milliseconds and stays relatively high for the first 500 milliseconds. When that initial period ends, the communication protocol associated with the second computing device 130 exits its passive listening mode (e.g., sniff mode). Once the passive listening mode has been exited, the packet delay associated with subsequent packets is reduced. For example, many packets have a delay significantly under 100 milliseconds.

After a significant number of packets have been exchanged, the exchange of packets ends for a period of time 710. After approximately one second without any packets being sent, the communication system associated with the second computing device (e.g., second computing device 130 in FIG. 1) reenters the passive listening mode. In this example, the amount of time without packets is about one second before the second computing device (e.g., second computing device 130 in FIG. 1) enters the listening mode.

Once the packets begin to be transmitted again, the packet delay value is still elevated. In response to the packets being transmitted again, the second computing device (e.g., second computing device 130 in FIG. 1) exits the passive listening mode again, and if the communication continues, the delay associated with packets will be reduced again.

Figure 8:
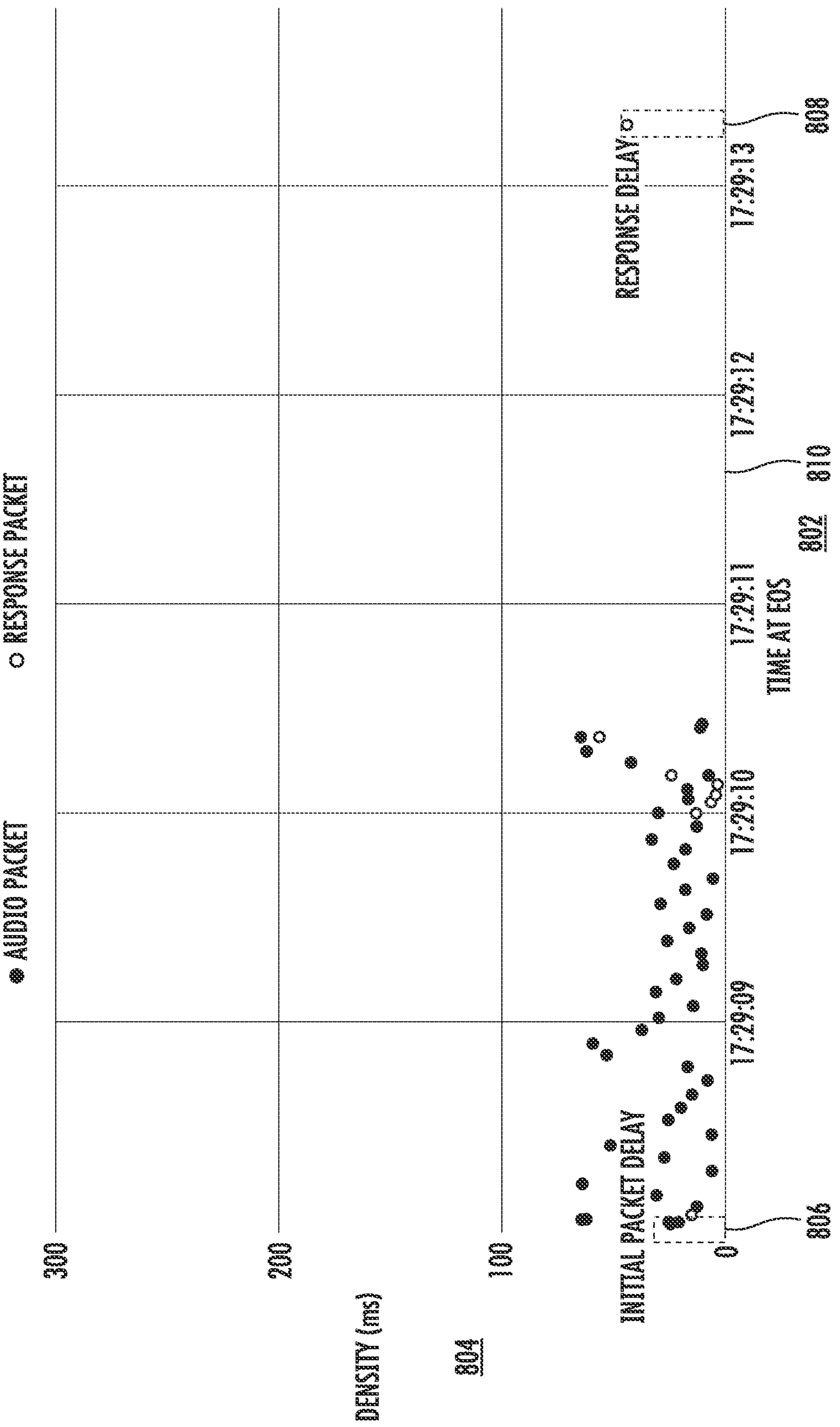
FIG. 8 is an example of a graph displaying the amount of packet delay for transmissions between a first computing device and a second computing device in accordance with the example embodiments of the present disclosure.

FIG. 8 is an example of a graph displaying the amount of packet delay for transmissions between a first computing device and a second computing device in accordance with the example embodiments of the present disclosure. In this example, the x-axis 802 of the graph represents time. The y-axis 804 represents the amount of delay in milliseconds for each packet.

In this example, the first computing device (e.g., first computing device 102 in FIG. 1) has continually used time synchronization requests to ensure that the second computing device (e.g., second computing device 130 in FIG. 1) never enters the passive mode. Note, as discussed above, rather than the second computing device 130 going into passive mode, it may be the communication link between the first computing device (e.g., first computing device 102 in FIG. 1) and the second computing device (e.g., second computing device 130 in FIG. 1) that can enter a passive mode. Thus, when the initial packets are sent When this occurs, the initial packet 808 has a relatively small packet delay. As can be seen, none of the initial packets in the initial packet delay 806 have a delay above 100 milliseconds. Similarly, despite a long packet delay 810 between approximately 1729.10.5 and 1729.13, the second computing device (e.g., second computing device 130 in FIG. 1) does not enter the passive listening mode. As a result, the response delay associated with the packets in the response delay period 808 after the pause is also below 100 milliseconds.

Figure 9:
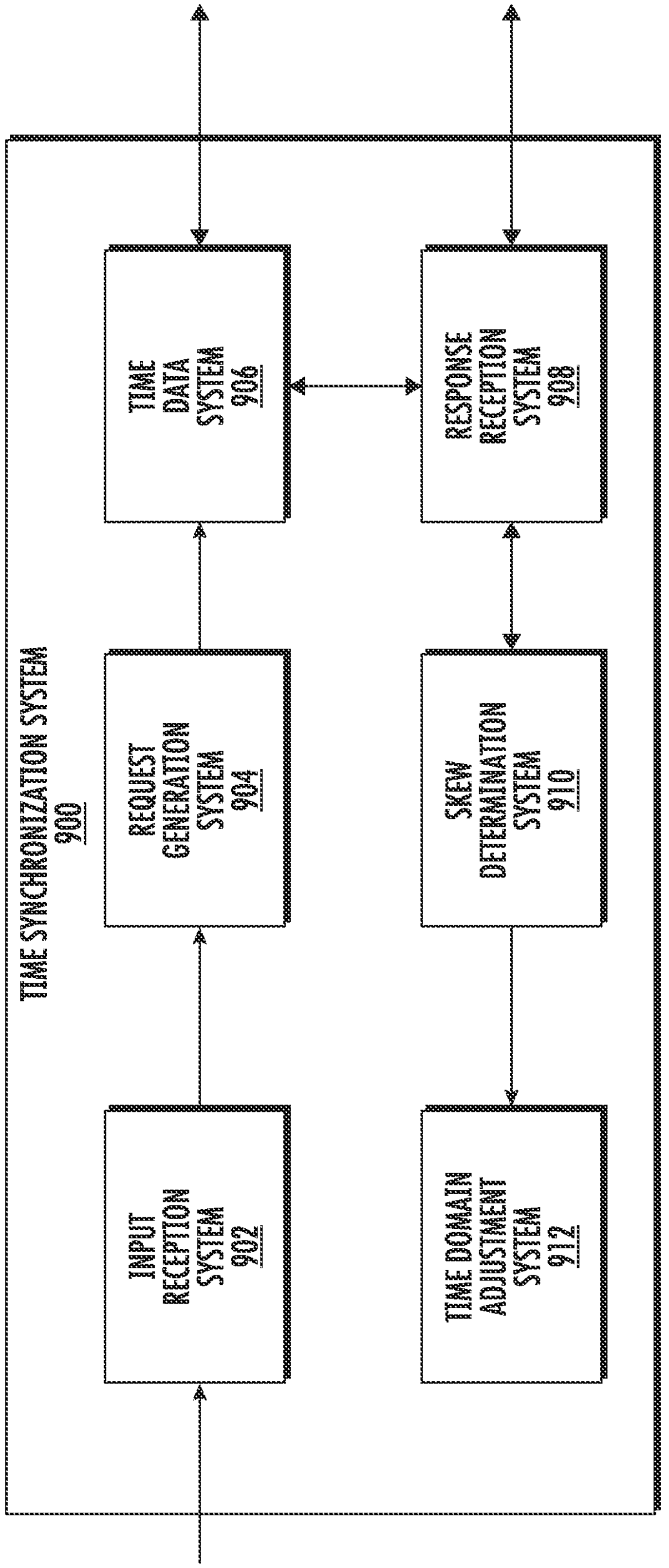
FIG. 9 represents an example system for estimating the skew based on a time synchronization request according to example embodiments of the present disclosure.

FIG. 9 represents an example system for estimating the skew based on a time synchronization request according to example embodiments of the present disclosure. The time synchronization system 900 includes an input reception system 902, a request generation system 904, a time data system 906, a response reception system 908, a skew determination system 910, and a time domain adjustment system 912.

The input reception system 902 can receive a request or query from a user. For example, if the time synchronization system 900 is part of a smartwatch, the user can interact with the smartwatch to initiate a new request. For example, the user can use a voice prompt or touch input on the touch screen with the smartwatch to initiate a query. When a query is initiated based on the input sensed by the input reception system 902, the request generation system 904 can begin generating time synchronization requests.

The request generation system 904 can generate a time synchronization request. The time synchronization request can be a request to a second computing device (e.g., second computing device 130 in FIG. 1) that can be used to determine the latency when communicating with the second computing device (e.g., second computing device 130 in FIG. 1). For example, the time synchronization request can initiate a process to determine the round-trip time when communicating with the second computing device (e.g., second computing device 130 in FIG. 1).

In some examples, the time synchronization request can enable the first computing device (e.g., first computing device 102 in FIG. 1) to estimate a time skew between the time domain of the first computing device (e.g., first computing device 102 in FIG. 1) and the time domain of the second computing device (e.g., second computing device 130 in FIG. 1).

The request generation system 904 can transmit the time synchronization request to the time data system 906. The time data system 906 can generate a timestamp or other time data that represents the time at which the time synchronization request is transmitted from the first computing device (e.g., first computing device 102 in FIG. 1) to a second computing device (e.g., second computing device 130 in FIG. 1). The generated time data can be included in the time synchronization request.

Once the time data is included, the time synchronization request can be transmitted to the second computing device (e.g., second computing device 130 in FIG. 1). The second computing device (e.g., second computing device 130 in FIG. 1) can be a smartphone or other computer device communicating with the first computing device (e.g., first computing device 102 in FIG. 1). The second computing device (e.g., second computing device 130 in FIG. 1) can, once it has received the time securitization request, generate a timestamp or other time data representing the time at which the time synchronization request is received. The time data representing when the time synchronization request was received by the second computing device (e.g., second computing device 130 in FIG. 1) is in the time domain of the second computing device (e.g., second computing device 130 in FIG. 1).

The second computing device (e.g., second computing device 130 in FIG. 1) can generate a time synchronization response. The second computing device (e.g., second computing device 130 in FIG. 1) can generate a timestamp (or other time data) when the time synchronization response is transmitted. Thus, the time synchronization response can include the time it was sent from the first computing device (e.g., first computing device 102 in FIG. 1) in first time domain, the time it was received at the second computing device (e.g., second computing device 130 in FIG. 1) in the second time domain, and the time the time synchronization response was transmitted from the second computing device (e.g., second computing device 130 in FIG. 1) in the second time domain. The reception response system 908 can receive the time synchronization response. The reception response system 908 can determine, using the time data system 906, the time at which the time synchronization response is received. This time (T4) can be in the first time domain associated with the first computing device (e.g., first computing device 102 in FIG. 1).

The skew determination system 910 can receive time data from the time synchronization response, including, the time at which the time synchronization request is sent from the first computing device (T1), the time at which the time synchronization request is received by the second computing device (T2), the time at time synchronization response is transmitted from the second computing device (T3), and the time at which the time synchronization response is received by the first computing device (T4). These four times and the minimum round-trip time between the two devices can be used by the skew determination system 910 to estimate the time skew between the first time domain associated with the first computing device and the second time domain associated with the second computing device.

The estimated time skew can be transmitted from the skew determination system 910 to the time domain adjustment system 912. The time domain adjustment system 912 can use the estimated time skew to correct the time data received from the second computing device to align it with the first time domain. Once the times from the second computing device have been converted into the time domain of the first computing device, the time domain adjustment system 912 can calculate a variety of information, including the one-way delay between the first computing device and the second computing device in both directions. These corrected time data can be used for a variety of purposes.

Figure 10:
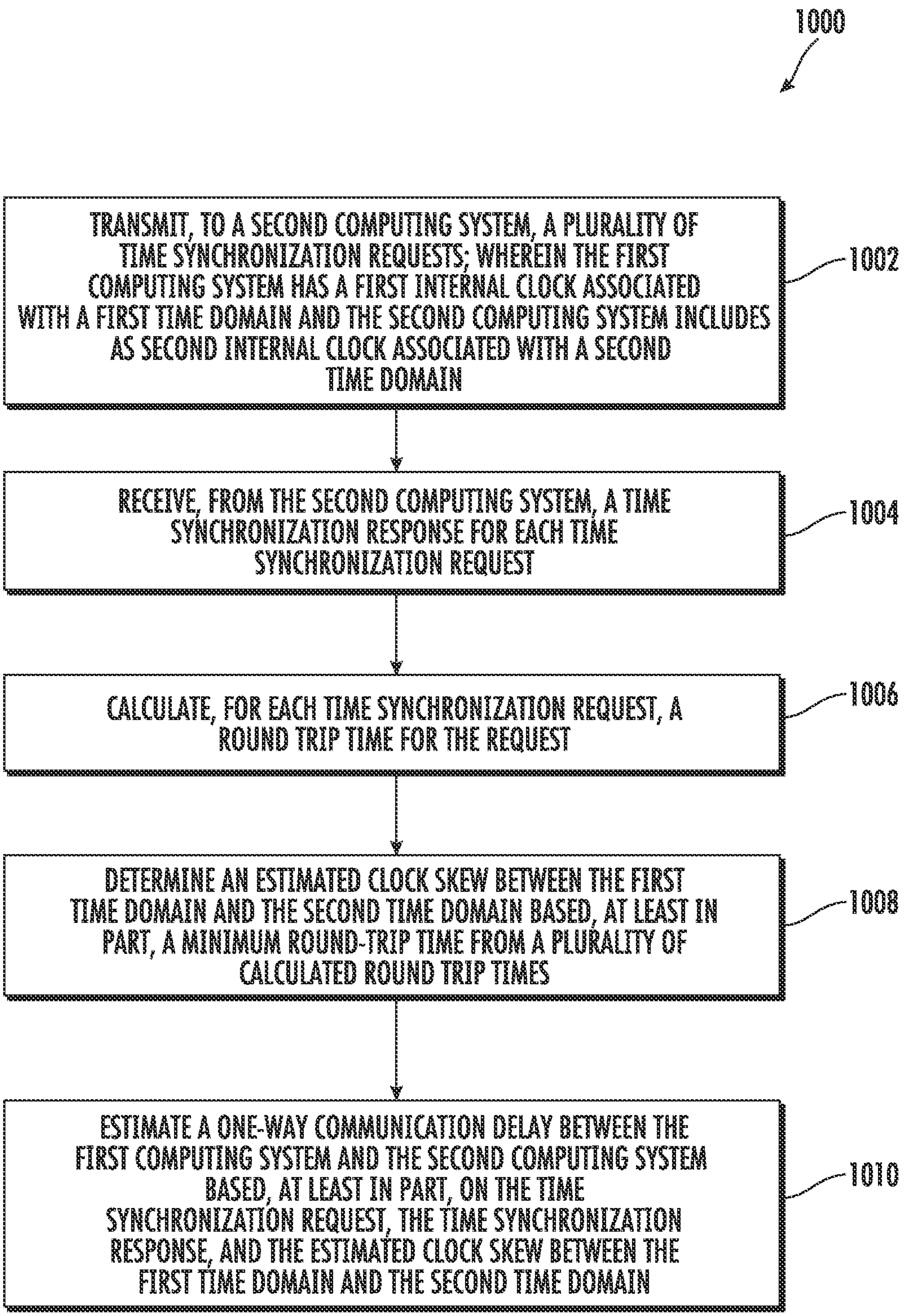
FIG. 10 depicts an example flow diagram for a method of estimating the skew between two different computing devices according to example embodiments of the present disclosure.

FIG. 10 depicts an example flow diagram for a method of estimating the skew between two different computing devices according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1 and 9.

In some examples, a first computing device can comprise one or more processors and one or more non-transitory computer-readable media. The non-transitory computer-readable media collectively store instructions that, when executed by the one or more processors, cause the computing system to perform operations. In some examples, the first computing device can receive a query request from a user. For example, a user may wish to submit a search query. To do so, the user can interact with the first computing device using voice input, touch input, input on an input device (e.g., a button or keyboard), and so on.

In response to receiving the query request from the user (along with any query request data), the first computing device can generate a plurality of query packets, the plurality of query packets representing the query request from the user. The first computing device can transmit the plurality of query packets to the second computing device in sequence.

In some examples, the first computing device (e.g., first computing device 102 in FIG. 1) can, at 1002, transmit, to a second computing device, a plurality of time synchronization requests; wherein the first computing device has a first internal clock associated with a first time domain and the second computing device includes a second internal clock associated with a second time domain. In some examples, a time synchronization request includes a request transmission time based on the first internal clock. The first computing device (e.g., first computing device 102 in FIG. 1) can generate time data (e.g., a timestamp) when the time synchronization request is sent and include that time data with the time synchronization request.

In some examples, the first computing device is a smartwatch that is paired with the second computing device. In some examples, the second computing device is a smartphone. In this example, the first computing device (e.g., first computing device 102 in FIG. 1) can be a smartwatch designed to primarily connect to a smartphone via a near-field wireless communication protocol such as the Bluetooth communication protocol. In this example, the first computing device (e.g., first computing device 102 in FIG. 1) does not generally connect to the Internet or other computing systems directly and instead communicates with the smartphone. Thus, in some examples, the first and second computing devices communicate using a wireless communication protocol.

In some examples, the wireless communication protocol has a low latency. A low latency can be defined with a specific range of latency values. For example, a low latency protocol can be defined as a communication protocol with an average latency of less than 20 milliseconds. However, the range of acceptable latency values can be determined based on the specific application and hardware that is being used to communicate between the first computing device (e.g., first computing device 102 in FIG. 1) and the second computing device (e.g., second computing device 130 in FIG. 1). In this way, a low latency value may be higher than 20 milliseconds for at least some particular use cases. In some examples, the wireless communication protocol is Bluetooth (e.g., the Bluetooth communication protocol.)

In some examples, the communication link between the first and second computing device are in an idle mode. In other examples, the second computing device is initially in an idle mode and a first time synchronization request in the plurality of time synchronization requests causes the second computing device (or the communication link between the first and second computing device) to enter an active communication mode. For example, the communication system associated with the second computing system can have two different operation modes. The first mode can be a passive listening mode (e.g., a sniff mode) in which the power consumption of the computing system is significantly lower than the active mode. While in the passive listening mode, the communication system has significantly higher communication delays. For example, in some cases, communicating with the communication system while in the passive mode can have a latency of 500 milliseconds. Thus, being in the passive mode can represent a significant delay and may result in a degraded user experience.

The second mode can be an active communication mode. While in the second mode, the communication system of the second computing device can have significantly reduced latency (e.g., a delay of around ten milliseconds). In some examples, once the query packets have been transmitted to the second computing device, the first computing device (e.g., first computing device 102 in FIG. 1) can continue to periodically transmit time synchronization requests such that the second computing device remains in the active communication mode (or the communication link remains in the active mode).

In some examples, the first time synchronization request is transmitted before any query packets are transmitted such that the second computing device enters the active communication mode before the query packets are transmitted (or the communication link enters the active mode). In this way, when the query packets begin to be transmitted, the communication system of the second computing device is already in the active communication mode. This reduces the latency perceived by the user.

In some examples, the first computing device (e.g., first computing device 102 in FIG. 1) can receive, at 1004, from the second computing device, a time synchronization response for each time synchronization request. The time synchronization response can include a request reception time at which the corresponding time synchronization request was received and a response transmission time at which the time synchronization response was transmitted. In some examples, the first computing device (e.g., first computing device 102 in FIG. 1) can receive the time synchronization response at a response reception time. The first computing device (e.g., first computing device 102 in FIG. 1) can store this response reception time for later use.

In some examples, the first computing device (e.g., first computing device 102 in FIG. 1) can, at 1006, calculate, for each time synchronization request, a round trip time for the request. For example, the first computing device (e.g., first computing device 102 in FIG. 1) can determine the round-trip time based on the time at which the time synchronization request was sent and the time at which the time synchronization response was received.

In some examples, the first computing device (e.g., first computing device 102 in FIG. 1) can calculate a round-trip time based on four times: 1) the time at which the time synchronization request was transmitted (T1), 2) the time at which the time synchronization request was received (T2), 3) the time at which the time synchronization response was sent (T3), and 4) the time at which the time synchronization response was received (T4). For example, round trip time can be calculated as $(T2-T1)+(T4-T3)$.

In some examples, the plurality of time synchronization requests are transmitted periodically. For example, the first computing device (e.g., first computing device 102 in FIG. 1) can transmit a new time synchronization request every 200 milliseconds. In some examples, the timing at which the time synchronization requests are sent is determined to ensure that the second computing device (e.g., second computing device 130 in FIG. 1) does not switch into passive listening mode. For example, if the second computing device (e.g., second computing device 130 in FIG. 1) transitions into a passive listening mode after 1000 milliseconds, the time synchronization request can be sent every 500 milliseconds.

The first computing device (e.g., first computing device 102 in FIG. 1) can, at 1008, determine an estimated clock skew between the first time domain and the second time domain based, at least in part, a minimum round-trip time from a plurality of calculated round trip times. In some examples, the first computing device (e.g., first computing device 102 in FIG. 1) can determine an estimated skew based on a comparison between the request sending time and the request reception time and a comparison between the response sending time and the response reception time. The first computing device (e.g., first computing device 102 in FIG. 1) can determine an error range for the estimated skew based on the estimated skew based on the minimum round-trip time. The first computing device (e.g., first computing device 102 in FIG. 1) can convert the request reception time to the first time domain using the estimated skew to produce a corrected request reception time.

In some examples, the first computing device (e.g., first computing device 102 in FIG. 1) can, at 1010, estimate a one-way communication delay between the first computing device and the second computing device based, at least in part, on the time synchronization request, the time synchronization response, and the estimated clock skew between the first time domain and the second time domain.

The first computing device (e.g., first computing device 102 in FIG. 1) can determine the one-way delay from the first computing device to the second computing device based on the request transmission time and the corrected request reception time. Similarly, the first computing device (e.g., first computing device 102 in FIG. 1) can determine the one-way delay from the second computing device (e.g., second computing device 130 in FIG. 1) to the first computing device (e.g., first computing device 102 in FIG. 1) based on the corrected response transmission time and the response reception time.

In some examples, the first computing device (e.g., first computing device 102 in FIG. 1) can convert the response transmission time to the first time domain using the estimated skew to produce a corrected response transmission reception time. The first computing device (e.g., first computing device 102 in FIG. 1) can determine the one-way delay from the first computing device to the second computing device based on the response reception time and the corrected request reception time.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A first computing device, the first computing device comprising: one or more processors; and one or more non-transitory computer-readable media that collectively store instructions that, when executed by the one or more processors, cause the first computing device to perform operations, the operations comprising:

transmitting, from the first computing device to a second computing device, a plurality of time synchronization requests; wherein the first computing device has a first internal clock associated with a first time domain and the second computing device includes a second internal clock associated with a second time domain and wherein each time synchronization request comprises a request transmission time;

receiving, from the second computing device, a time synchronization response comprising a request reception time for each time synchronization request;

calculating, for each time synchronization request, a round trip time for the request;

determining an estimated clock skew between the first time domain and the second time domain based, at least in part, a minimum round-trip time from a plurality of calculated round trip times;

converting the request reception time to the first time domain using the estimated skew to produce a corrected request reception time; and estimating a one-way communication delay between the first computing device and the second computing device based, at least in part, on the request transmission time and the corrected request reception time.

2. The first computing device of claim 1, wherein the request transmission time is based on the first internal clock.

3. The first computing device of claim 2, wherein the request reception time represents a time at which the corresponding time synchronization request was received and the time synchronization request further comprises a response transmission time at which the time synchronization response was transmitted.

4. The first computing device of claim 3, wherein the first computing device receives the time synchronization response at a response reception time.

5. The first computing device of claim 4, wherein determining a time skew between the first time domain and the second time domain further comprises:

determining an estimated skew based on a comparison between the request transmission time and the request reception time and a comparison between the response transmission time and the response reception time; and determining an error range for the estimated skew based on the estimated skew based on the minimum round trip time.

6. The first computing device of claim 5, further comprising:

converting the response transmission time to the first time domain using the estimated skew to produce a corrected response transmission reception time; and determining the one way delay from the second computing device to the first computing device based on the response reception time and the corrected request reception time.

7. The first computing device of claim 1, wherein the first computing device is a smartwatch that is paired to the second computing device.

8. The first computing device of claim 1, wherein the second computing device is a smartphone.

9. The first computing device of claim 1, wherein the first computing device and the second computing device communicate using a wireless communication protocol.

10. The first computing device of claim 9, wherein the wireless communication protocol has a low latency.

11. The first computing device of claim 10, wherein the wireless communication protocol is Bluetooth.

12. The first computing device of claim 10, wherein the wireless communication protocol has a minimum latency of below 20 milliseconds.

13. The first computing device of claim 1, wherein the plurality of time synchronization requests are transmitted periodically.

14. The first computing device of claim 1, wherein a communication link between the first computing device and the second computing device is initially in an idle mode and a first time synchronization request in the plurality of time synchronization requests causes the communication link between the first communication device and the second computing device to enter an active communication mode.

15. The first computing device of claim 14, further comprising, prior to transmitting a first time synchronization request:

receiving a query request from a user;

in response receiving the query request from the user, generating a plurality of query packets, the plurality of query packets representing the query request from the user; and transmitting the plurality of query packets to the second computing device in sequence.

16. The first computing device of claim 15, further comprising, after transmitting the plurality of query packets to the second computing device in sequence:

continuing to periodically transmit time synchronization requests such that the communication link between first computing device and the second computing device remains in the active communication mode.

17. The first computing device of claim 15, wherein the first time synchronization request is transmitted before any query packets are transmitted such that the communication link between first computing device and the second computing device enters the active communication mode before the query packets are transmitted.

18. A computer-implemented method, comprising:

transmitting, from a first computing device to a second computing device, a plurality of time synchronization requests; wherein the first computing device has a first internal clock associated with a first time domain and the second computing device includes a second internal clock associated with a second time domain and wherein each time synchronization request comprises a request transmission time;

receiving, by the first computing device, from the second computing device, a time synchronization response comprising a request reception time for each time synchronization request;

calculating, by the first computing device for each time synchronization request, a round trip time for the time synchronization request;

determining, by the first computing device, an estimated clock skew between the first time domain and the second time domain based, at least in part, a minimum round-trip time from a plurality of calculated round trip times;

converting, by the first computing device, the request reception time to the first time domain using the estimated skew to produce a corrected request reception time; and estimating, by the first computing device, a one-way communication delay between the first computing device and the second computing device based, at least in part, on the request transmission time and the corrected request reception time on.

19. One or more non-transitory computer-readable media that collectively store instructions that, when executed by a first computing device, cause the first computing device to perform operations, the operations comprising:

transmitting, from the first computing device to a second computing device, a plurality of time synchronization requests; wherein the first computing device has a first internal clock associated with a first time domain and the second computing device includes a second internal clock associated with a second time domain and wherein each time synchronization request comprises a request transmission time;

receiving, from the second computing device, a time synchronization response comprising a request reception time for each time synchronization request;

calculating, for each time synchronization request, a round trip time for the request;

determining an estimated clock skew between the first time domain and the second time domain based, at least in part, a minimum round-trip time from a plurality of calculated round trip times;

converting the request reception time to the first time domain using the estimated skew to produce a corrected request reception time; and estimating a one-way communication delay between the first computing device and the second computing device based, at least in part, on the request transmission time and the corrected request reception time.

* * * * *